Oct. 28, 1924.
T. ELLIOTT
VEHICLE BODY
Filed June 28, 1921
1,513,541
3 Sheets-Sheet 1
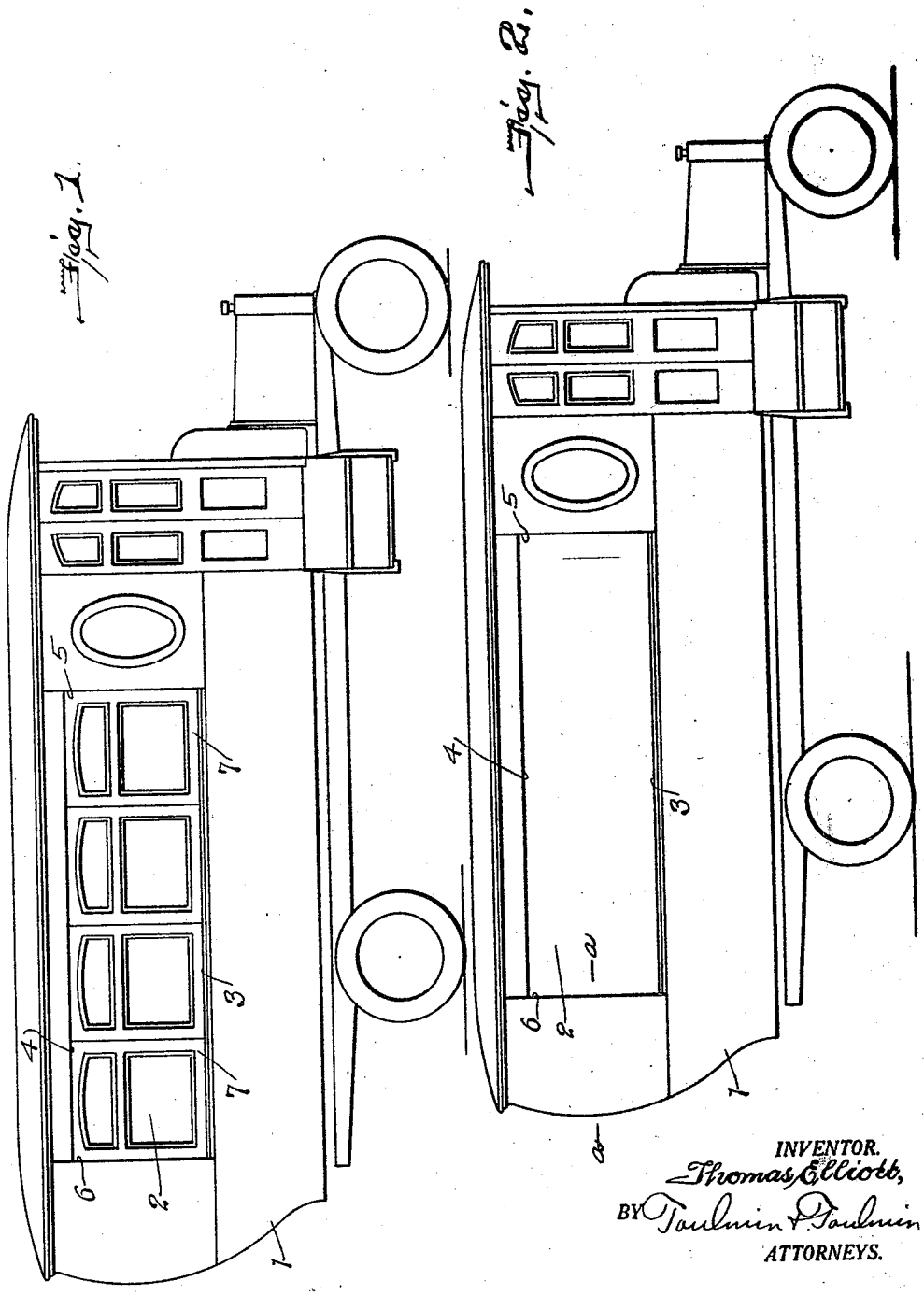
INVENTOR.
Thomas Elliott,
BY Toulmin & Toulmin
ATTORNEYS.

Oct. 28, 1924.
T. ELLIOTT
VEHICLE BODY
Filed June 28, 1921
1,513,541
3 Sheets-Sheet 2
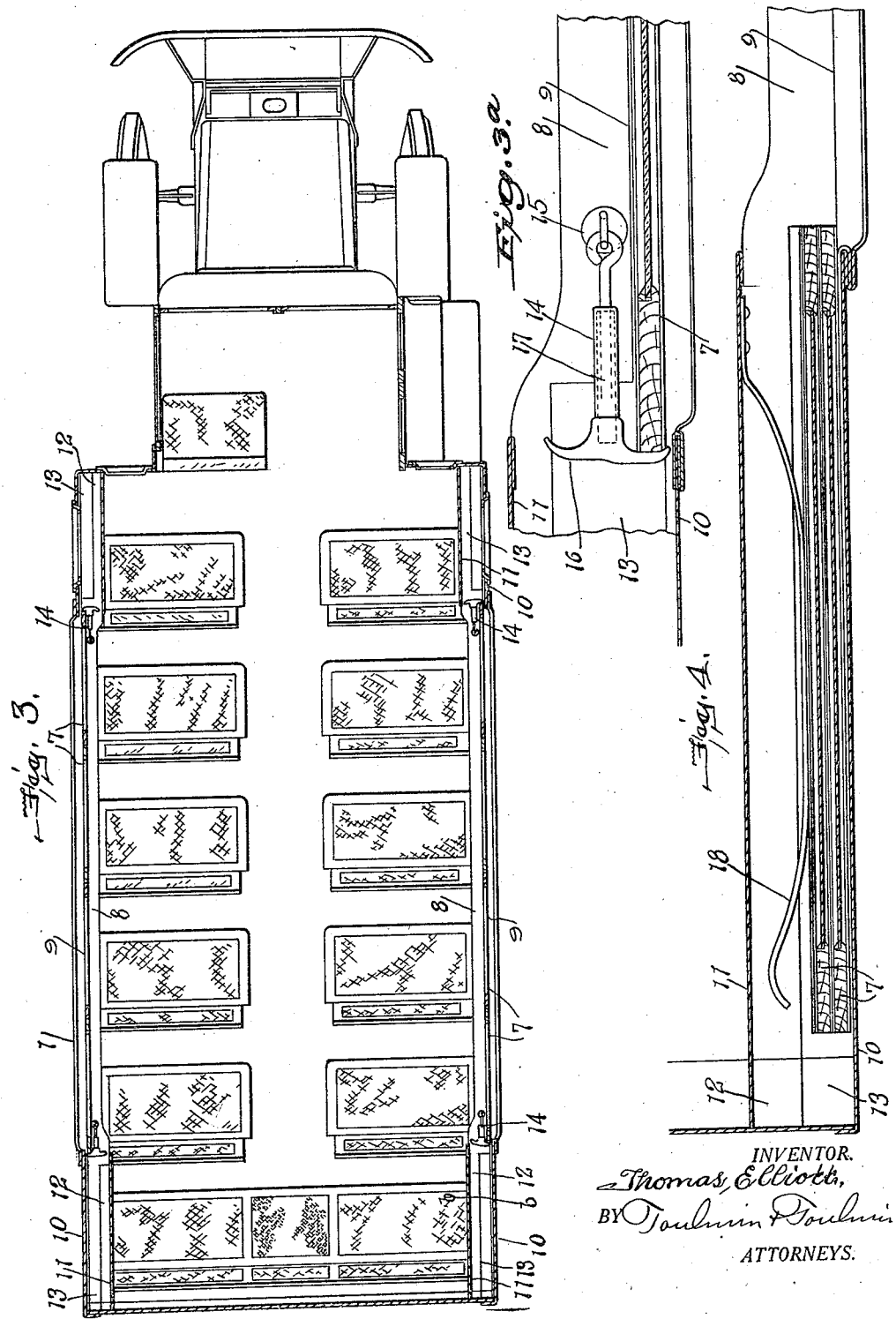
INVENTOR.
Thomas Elliott,
BY Toulmin & Toulmin
ATTORNEYS.

Oct. 28, 1924.
T. ELLIOTT
VEHICLE BODY
Filed June 28, 1921
1,513,541
3 Sheets-Sheet 3
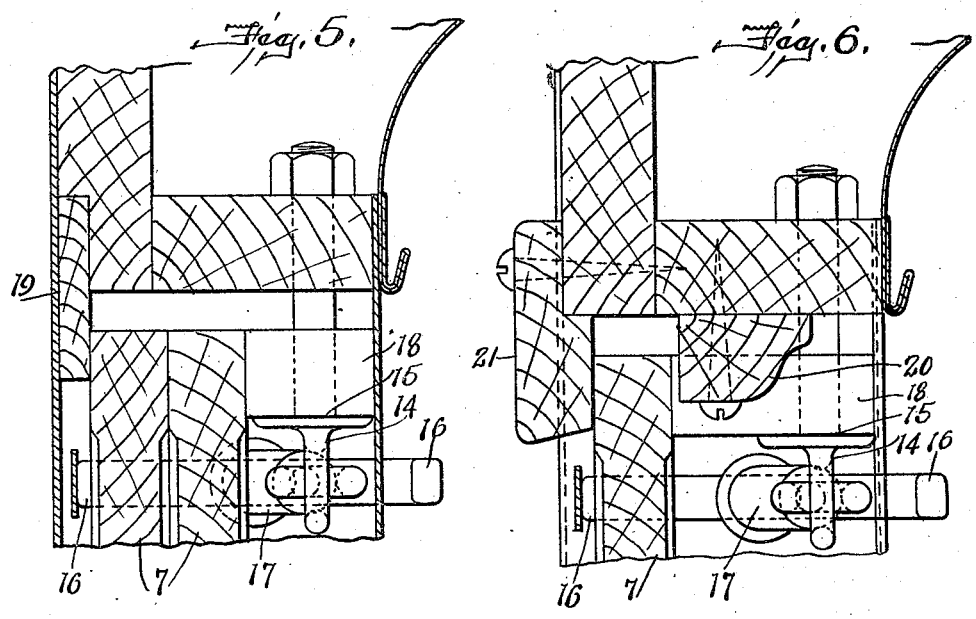
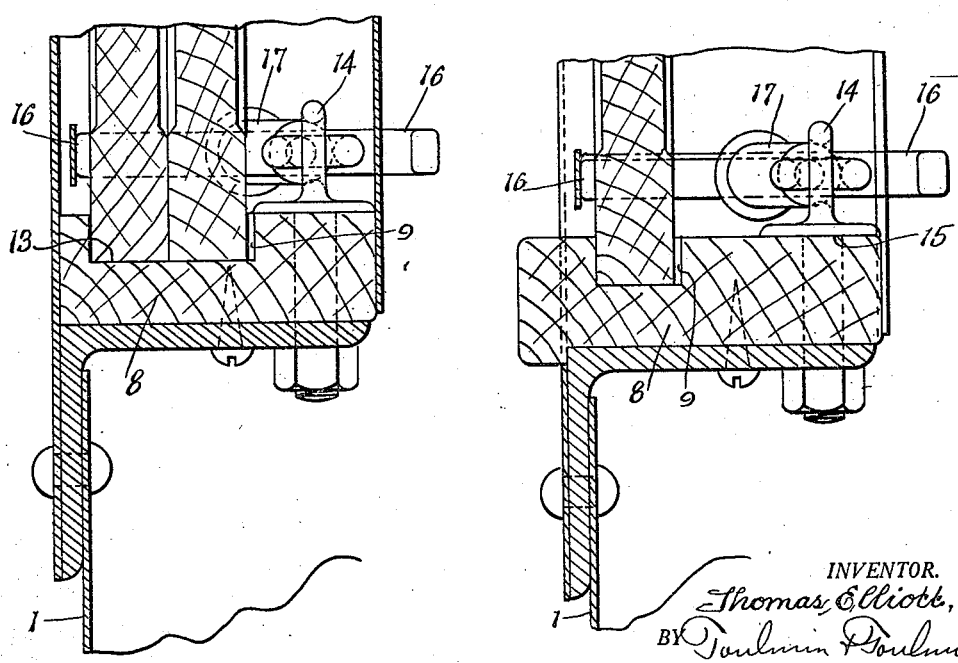
INVENTOR.
Thomas Elliott,
BY Toulmin & Toulmin
ATTORNEYS.

Patented Oct. 28, 1924.

1,513,541

UNITED STATES PATENT OFFICE.

THOMAS ELLIOTT, OF CINCINNATI, OHIO, ASSIGNOR TO THE CINCINNATI CAR COMPANY, OF CINCINNATI, OHIO, A CORPORATION OF OHIO.

VEHICLE BODY.

Application filed June 23, 1921. Serial No. 481,119.

*To all whom it may concern:*

Be it known that I, THOMAS ELLIOTT, a citizen of the United States, residing at Cincinnati, in the county of Hamilton and State of Ohio, have invented certain new and useful Improvements in Vehicle Bodies, of which the following is a specification, reference being had therein to the accompanying drawing.

This invention relates to vehicle bodies, particularly bodies for motor busses and electric railway cars, more especially the former.

The general object which I have in view, and which this invention accomplishes, is the provision in such a vehicle body of an open unobstructed space at each side, without the usual side posts, so that when the sashes are withdrawn the body will be converted from a sash-enclosed winter body to an open summer body; and also the provision at each end of the body of a pocket or enclosed space for the reception of the sashes when they are removed from their places along the sides of the body, some of the sashes being stored in one pocket and the others in the other pocket.

The present invention relates to the same general subject matter as that set forth in my companion application filed June 20, 1921, Ser. No. 478,880, but differs therefrom in the particular that in the present invention there are a pair of or two, pockets at each side of the body, one at the forward and the other at the rear end, to distribute the sashes between two pockets instead of putting all of the sashes at one end of the car in one pocket, as illustrated in said other application.

These general objects, and others of an incidental nature are fully carried out by the form of my invention exemplified in the accompanying drawings.

In these drawings:—

Fig. 1 is a side elevation of my improved body in the form adapted for motor busses, with the sashes in closed position;

Fig. 2 is a like view of the body with the sashes removed from closed position to leave the body open at the sides;

Fig. 3 is a partial plan and partial horizontal sectional view of the body with the sashes in closed position;

Fig. 3ª is a detail view of the spring retainer;

Fig. 4 is an enlarged sectional view on the line *a—a* of Fig. 2 showing the pockets and the sashes in them;

Fig. 5 is an enlarged vertical sectional view of one side of the body, taken on the line *b—b* of Fig. 3;

Fig. 6 is a like view taken on the line *c—c* of Fig. 3.

In Figs. 1 and 2 of the drawings I have shown, for purposes of illustration, my improved vehicle body in a form adapted for use in motor busses, but it is to be understood that so far as concerns the general arrangement and type of the body it may be such as is applicable for use in street and interurban railway cars.

Therefore, it will be understood that the body designated generally by the numeral 1 may be of any of the usual or approved types of construction, except in the particulars now to be noted, namely, the elimination of the usual side posts which occupy vertical positions along the sides of the body and divide off the space into a succession of window openings. These posts are done away with under the terms of my invention. Instead the space indicated at 2 is continuous or undivided from the sill 3 to the crown 4 and from the forward end 5 to the rear end 6. This space is occupied by the sashes 7, as shown in Figs. 1 and 3.

Along the bottom of the open space 2 and at the top of the panel of the body is placed, one at each side, a lower sash rest 8, as best seen in Fig. 3. This rest is formed with a sash-groove 9 in which the lower ends of the sashes are mounted to slide. The groove is wide enough to receive one sash only so that the sashes are positioned edge to edge, as also seen in Fig. 3.

Within the outer wall or panel 10 and the inner lining or panel 11 of the vehicle body I extend the portions 12 of the sash rest 8 and widen out the groove 9 to a wider groove 13 to accommodate a pair of sashes, as seen in Fig. 4.

Thus, when the vehicle is to be used as a summer car or buss the sashes will be slid into these pockets, say one-half or a portion of them into each pocket. But when the weather is stormy or cold or for any reason it is desired to make a closed vehicle body, then the sashes are returned to the grooves 9, as shown in Figs. 1 and 3. To retain them against working out of place by reason of jarring I provide a suitable sash-retaining device, preferably that fully set forth and illustrated in my said application, referred to above. In the present drawings I designate this spring device with the numeral 14 and locate one of them at each of the points shown in Fig. 3. They are anchored to the sash rest at 15 and their heads 16 are drawn against the sashes by means of a spring contained within a sleeve 17. To disconnect this device from the sash it is merely necessary for the operator to place his finger against the head 16 and draw it away from the sash. Then the sash can be slid back into the pockets.

Referring to Fig. 4 it will be seen that a spring 18 is secured in the pockets and adapted to press upon the adjacent sash in a manner to hold the sashes in the pocket and against rattling.

Referring to Fig. 5 it will be seen how the sash-rest 8 is formed with the wide groove 13 to hold the plurality of sashes while they are in the pockets. This figure shows both the rest 8 at the bottom of the pocket and the means of retaining the sashes at the upper end of the pocket, namely, the body strip 19 and the upper spring 18.

Referring to Fig. 6 it will be seen how the lower rest 8 is formed to provide the lower sash-groove 9 and how also the upper parts of the sashes are held when in closed position by the inner molding 20 and the outer molding 21.

It will now be seen how my vehicle body is convertible from a closed to an open one and how the sashes are held in closed position and how retained or stored when the body is being used as an open one.

Having thus fully described my invention, what I claim as new and desire to secure by Letters Patent, is:

1. A vehicle body having an open postless space extended throughout the major portion of the length of the body and provided with sash ways at the top and bottom thereof, and having a sash pocket contiguous with each end of said postless space, with sash guides therein contiguous with the guides in the space, a plurality of sashes adapted alternately to occupy said space and close it and to occupy said pockets, some in each pocket, and sash retaining spring devices, one of which devices being positioned at each end of said open space and detachably engageable with the end edge of the respective end sashes, when all the sashes are positioned edge to edge in said open space.

2. A vehicle body having in each side wall an unobstructed open postless space provided with sash ways near its upper and lower margins and a sash pocket contiguous with each end of each postless space, each pocket having sash ways near its upper and lower margins, the ways in the space being adapted to retain the sashes edge to edge and the ways in the pockets to retain said sashes side by side, some in each pocket, and sash retaining spring devices, one of which devices being positioned at each end of said open space and detachably engageable with the end edge of the respective end sashes, when all the sashes are positioned edge to edge in said open space.

3. A vehicle body having in its side wall an unobstructed open postless space provided with sash ways near its upper and lower margins, and a sash pocket contiguous with each end of said space, said pockets having sash ways near their upper and lower margins, the ways in the space being adapted to retain the sashes edge to edge and the ways in the pockets to retain the sashes side by side, some in each pocket, and sash retaining spring devices acting to hold the sashes in contact edge to edge and other spring devices to hold the sashes in contact side by side each of said retaining devices comprising a member anchored pivotally adjacent a respective end of the open space and a spring pressed member telescopically engaging the first member and provided with a sash edge engaging hook.

4. A vehicle body having an open postless space extending through the major portion of each side, a pocket at each end of each such space, a sash rest at the bottom of each such space and the adjacent pockets and sash guides at the top of each such space and the adjacent pockets, sashes adapted to alternately occupy each such space and its adjacent pockets, some in each pocket, and a sash retaining spring device comprising a member anchored to the body and another member adapted to engage and disengage a sash, one such device at each side of the body and acting rearwardly on a forward sash and another such device at each side acting forwardly on a rear sash.

In testimony whereof, I affix my signature.

THOMAS ELLIOTT.